United States Patent
Wang et al.

(10) Patent No.: US 6,587,447 B1
(45) Date of Patent: Jul. 1, 2003

(54) METHOD AND SYSTEM FOR PERFORMING OUTER LOOP POWER CONTROL IN DISCONTINUOUS TRANSMISSION MODE

(75) Inventors: Yiping Wang, Plano, TX (US); David Paranchych, Richardson, TX (US); Ashvin Chheda, Dallas, TX (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/410,209

(22) Filed: Sep. 29, 1999

(51) Int. Cl.$^7$ ............................................. H04B 7/216
(52) U.S. Cl. ...................................... 370/335; 370/332
(58) Field of Search ................................ 370/335–342, 370/329, 328, 331, 332, 318; 455/522, 226.2, 226.3, 69, 317, 318, 511

(56) References Cited

U.S. PATENT DOCUMENTS

| | | | | |
|---|---|---|---|---|
| 6,137,789 A | * | 10/2000 | Honkasalo | 370/342 |
| 6,219,342 B1 | * | 4/2001 | Rege | 370/318 |
| 6,301,485 B1 | | 10/2001 | Lee | |
| 6,373,823 B1 | * | 4/2002 | Chen et al. | 370/252 |

OTHER PUBLICATIONS

Jinsoo Park et al. "Quality Indicator Bit (FPC_MODE 100)", Samsung Electronics Co. Ltd., 1999, pp 1–3.*

Jaemin Ahn et al., "Frame Error Estimation of DCCH in DTX Mode", Samsung Electronics Co., Ltd., pp. 1–11, 1999.

Jimsoo Park et al., Quality Indicator Bit (FPC_MODE 100), Samsung Electronics Co., Ltd., pp. 13, Jul. 1999 Montreal.

Soon Young Yoon et al., Performance of P2 Gating Operation, Samsung Electronics Co., Ltd., Jul. 26–30, 1999, Boulder, CO.

Baker, M P J, "Power Control in UMTS Release '99", 3G Mobile Communication Technologies, Conference Publication No. 471, IEEE 2000, pp. 36–40 XP–000900538.

Wang, Yiping, "Power Control Methods for Dedicated Control Channels During Discontinuous Transmission in IS–2000 Systems", 11th IEEE International Symposium on Personal, Indoor and Mobile Radio Communications 2000, Sep. 18–21, 2000, London, UK, pp. 271–275. XP–002213158.

* cited by examiner

Primary Examiner—Vivian Chin
Assistant Examiner—Eliseo Ramos-Feliciano
(74) Attorney, Agent, or Firm—John D. Crane; Bracewell & Patterson, L.L.P.

(57) ABSTRACT

A method for controlling unnecessary power increases and call drop during discontinuous transmission (DTX) mode of a frame-based transmission system. The method comprises the steps of (1) detecting, at a receiver end of the transmission system a status of a transmitted frame indicating one of two possible transmission modes including (a) when a gating-off of the traffic channel occurs, and (b) when no gating-off of traffic occurs and normal traffic is being transmitted, and (2) controlling a change in the receiver target bit energy to noise spectrum density ratio Eb/No in response to the detection step so that a receiver target Eb/No is increased only when the detecting step does not indicate a gating-off of traffic has occurred.

18 Claims, 9 Drawing Sheets

METHOD AND SYSTEM FOR PERFORMING OUTER LOOP POWER CONTROL IN DISCONTINUOUS TRANSMISSION MODE

CROSS-REFERENCE TO RELATED PATENT APPLICATION

The present invention is related to the subject matter of co-pending United States Patent Application entitled "Method and System for Implementing Outer Loop Power Control In Discontinuous Transmission Mode Using Explicit Signaling," filed concurrently herewith, Ser. No. 09/410,208, assigned to the assignee herein named. The contents of the co-pending patent application are incorporated by reference herein.

BACKGROUND OF THE INVENTION

1. Technical Field:

The present invention relates in general to Code Division Multiple Access (CDMA) systems and in particular to a Dedicated Control Channel (DCCH) and a Supplemental Channel (SCH) in a CDMA system. Still more particularly, the present invention relates to a method and system for controlling power in a DCCH and a SCH of a CDMA system operating in Discontinuous Mode (DTX).

2. Description of the Related Art:

The fast growth in the use of wireless means of communication has resulted in a complex process for world wide frequency allocations and a number of frequency allocation protocols. Code Division Multiple Access (CDMA) is one of the distinct digital channel sharing topologies which have emerged as a result of a growing need for more channels or more efficient use of channels in digital communication. In a typical CDMA system, a honeycomb type pattern of cells is created which utilizes the same range of radio frequencies. CDMA systems can utilize precisely the same frequency spectrum in all sectors. This allows a single frequency to serve multiple users. The CDMA air interface is very efficient in its use of the subscriber station transmitter power, enabling the widespread commercial use of low cost, lightweight, hand-held portable units that have vastly superior battery life. The technology is also very efficient in its link budgets, minimizing the number of base stations required for an excellent grade of service coverage. Also, CDMA's use of soft handoff (occurring when a user passes across a cell boundary) nearly eliminates the annoyance of dropped calls, fading, and poor voice quality.

The specifications for CDMA operation are outline in the Electronic Industries Association/Telecommunications Industry Association (EIA/TIA) IS-95-A & TSB74 standards document entitled Mobile Station-Base Station Compatibility Standard for Dual-Mode Wideband Spread Spectrum Cellular System or *CDMA Principles of Spread Spectrum Communication*, by Andrew J. Viterbi. Recent developments in CDMA technology have led to the development of the IS-2000 standard to replace the traditional IS-95 standard.

The cdma2000 family of standards specifies a spread-spectrum radio interface that uses CDMA technology to meet the requirements for third generation (3 G) wireless communication systems. Development of the cdma2000 family of standards has, to the greatest extent possible, adhered to the current architecture by specifying different layers in different standards. The physical layer is specified in IS-2000-2, the Medium Access Control (MAC) layer in IS-2000-3, the Link Access Control (LAC) layer in IS-2000-4, and upper layer signaling in IS-2000-5. The standards in the family correspond to the CDMA layers, and include:

- IS-2000-1 Introduction to cdma2000 standards for spread spectrum systems
- IS-2000-2 Physical Layer Standard for cdma2000 spread spectrum systems
- IS-2000-3 Medium Access Control (MAC) Standard for cdma2000 spread spectrum systems
- IS-2000-4 Signaling Link Access Control (LAC) Standard for cdma2000 spread spectrum systems
- IS-2000-5 Upper Layer (Layer 3) Signaling Standard for cdma2000 spread spectrum systems In addition, the family includes a standard that specifies analog operation, to support dual-mode mobile stations and base stations:

- IS-2000-6 Analog Signaling Standard for cdma2000 spread spectrum systems

During normal operation, CDMA systems utilize frame transfer by which data is stored and transferred in a frame protocol format. Each frame has an associated power control block of bits which assist in ensuring that the signals are transmitted with sufficient power to be recognized at the receiver end for a given Grade of Service (GOS). As a CDMA phone is transmitting, the receiving cell site is constantly measuring the signal strength of the transmission. When the signal weakens, the transceiver in the cell site transmits power control up commands to the phone, instructing it to increase its power. If the signal strengthens, power control down commands instruct the phone to decrease its power.

The IS-95 standard, defines procedures for a complex power control method, designed to save on battery life and help prevent co-channel interference. The IS-2000 standard has been introduced to replace the IS-95 standard and incorporates many of the power attributes of its predecessor. Throughout the remainder of this document, use of the term CDMA, cdma2000 or IS-2000 refers to the cdma2000 family of standards.

In IS-2000, power considerations are important for efficient use of the system. Thus, the IS-2000 standard includes a dedicated control channel (DCCH). Assuming an efficient power control method, the use of DCCH can provide up to 3.8 dB gain when no data is being sent. This gain is a result of discontinuous transmission (DTX). When there is no data to send, DCCH is able to stop transmitting everything but power control bits in frames, while the fundamental channel (FCH) has to transmit eighth rate frames. However, the DTX transmission on DCCH may often degrade the performance of outer loop power control (i.e., the mechanism which adjusts the target Eb/No on a per frame basis) on both the forward and reverse links. This decreases the potential gain achievable from the use of the DCCH and may result in a performance penalty.

Thus, two major problems exist in the use of DCCH in DTX mode. These are (1) problem in outer loop power control resulting in reduced capacity, and (2) possible call drop. Both problems stem from the receiver's inability to distinguish between an erroneous frame and a cessation of transmission. In normal operating modes, when a frame error is detected at the Receiver Station, the receiver increases the target bit energy to noise spectrum density ratio (Eb/No). Otherwise, the target signal power level (Eb/No) is decreased. However, during DTX period, only power control bits are transmitted. In this case, the receiver is not able to distinguish between an error frame and a cessation of transmission. The misinterpretation of a transmission stoppage as a bad frame causes the receiver to increase its target Eb/No, and thereby commands the transmitter to power up unnecessarily. If the transmitter is smart enough, it can ignore this power up command as it knows it is in DTX mode. However, when the data transmission resumes, the target Eb/No at the receiver is too high Consequently, the transmitter is forced to transmit data at a higher power level than necessary. In addition, the mobile unit stops transmission on the reverse link if it receives twelve consecutive erroneous frames on the forward link and it drops the call if there are no two consecutive good frames during any five second period Therefore, DTX on the DCCH may also lead to possible call drops if no detection is used to determine when DTX is on or off.

Samsung has proposed two methods of frame error estimation of DCCH in DTX mode to try to solve the outer loop power control problem. These methods focus on the forward link and estimate the forward link error of the DCCH in DTX. The methods are summarized below.

1. Mobile System (MS) measures the average Eb/No using power control bits over a frame and maps it into frame error rate (FER) using a lookup table made from the additive white gaussian noise (AWGN) channel with a pre-determined offset value. Then the MS determines frame error in a stochastic way, i.e., generating a random number uniformly distributed over [0, 1] and comparing it with the FER. If the random number is larger than the FER, then the received frame is considered as a good frame. Otherwise, a frame error occurs.

2. MS measures the average Eb/No power control bits over one frame duration and compares the average Eb/No with the certain threshold value. If the average Eb/No is less than the threshold, the frame is considered bad. Otherwise the frame is considered good.

One obvious drawback with both methods is that while they may work well with a particular case for which they are optimized (eg., a particular MS speed and a channel condition), they will not work well with all other cases, such as, different MS speeds and propagation environments, since the relationship between Eb/No and frame error rate (FER) is not the same for different channel conditions.

Additionally, in the first method, a lookup table for Eb/No to FER mapping is very critical to the performance. In reality the Eb/No-FER relation varies widely with different propagation conditions. An inaccurate Eb/No-FER mapping could drastically degrade performance of the system using Samsung's first approach.

In the second method, the value of the threshold is critical to the performance. It, in fact, also depends on the accuracy of Eb/No to FER mapping. If the value is set at the required Eb/No value for a given set of conditions, it will result in a very high average forward gain with no frame errors in some other conditions. Therefore, power is wasted. There is an optimal threshold at which the same performance and capacity could be achieved as usual forward link outer loop power control. However, this optimal value is highly sensitive to the mobile speed and propagation environment. There is no way to define a unified value. Moreover, a little bias in the threshold will lead to a big performance or capacity degradation. Evaluations of the performance of the second method yield results which are represented in the tables of Appendix B. Similar results can be expected with the first method.

The simulations of Appendix B indicate that the optimal threshold value in Samsung's method is sensitive to the MS speed and location (interference environment). Although the Samsung methods solve the call drop issue, they degrade the system performance or capacity. Furthermore, they do not help on the forward link. It is also expected that the threshold varies with the number of multipaths and propagation environment. Therefore, there is no way to define a unified optimal threshold value in Samsung's method. To meet the target FER in all scenarios, a worst case threshold could be defined in their method. However, this threshold value will sacrifice a lot of forward power in most cases.

The present invention thus recognizes that it would be desirable to have a method and system for preventing unnecessary power up of transmitters as a result of false readings of frame transmission during DTX. It would further be desirable to keep target Eb/No from unnecessarily increasing while also preventing the mobile unit from mistakenly stopping reverse transmission and/or dropping calls due to DTX.

SUMMARY OF THE INVENTION

It is therefore one object of the present invention to provide an improved CDMA system.

It is another object of the present invention to provide an improved power control method and system for a CDMA system.

It is yet another object of the present invention to provide an improved method and system for controlling power in a CDMA system operating in Discontinuous Mode (DTX).

The foregoing objects are achieved as is now described. A method for controlling unnecessary power increases and call drop during discontinuous transmission (DTX) mode of a frame-based transmission system is provided. The method comprises the steps of (1) detecting, at a receiver end of the transmission system a status of a transmitted frame indicating one of two possible transmission modes including (a) when a gating-off of the traffic channel occurs, and (b) when no gating-off of traffic occurs and normal traffic is being transmitted; and (2) controlling a change in the target bit energy to noise spectrum density ratio Eb/No in response to the detecting step so that a target Eb/No is increased only when the detecting step does not indicate a gating-off of traffic has occurred.

In a preferred embodiment of the invention, the detecting step includes calculating a ratio of a traffic signal-to-noise ratio (SNR) value to a SNR value of a power control bit stream over a frame period, establishing a threshold value correlated to a point above which the ratio indicates a normal frame is being transmitted, and comparing the ratio with the threshold. The target signal strength is then adjusted based on the results of the comparison.

In another preferred embodiment, the detecting step includes identifying one or more of a plurality of power control bits per frame as a DTX indicator and manipulating the bit to indicate to a receiver when a traffic channel in the frame is gated-off. When the frame arrives at the receiver the bit is analyzed and the target signal strength or bit energy to noise spectrum density (Eb/No) is adjusted accordingly.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention implements a power control method for use in transmission of packets on a DCCH and a SCH of a CDMA system in DTX mode. The invention is applicable to both the forward and reverse links. The invention solves the power control and call drop problems inherent in prior systems by letting the receiver (i.e., the base station or mobile station depending on whether transmission is in the reverse or forward link) know whether or not the transmitter has gated off the traffic channel on the DCCH or SCH. The invention provides a way to keep the forward or reverse target Eb/No from unnecessarily increasing during DTX mode. By implementing the invention, the system capacity will improve when the DCCH or SCH is used substantially. Two different power control methods/algorithms are described herein which are suitable for use in different transmission states. In one preferred embodiment, the invention provides a method to detect if DTX is on or off without the reliance on explicit signalling. In another embodiment, one or two power control bits per frame are utilized as a DTX indicator to keep the target Eb/No from unnecessarily increasing during DTX such that the system capacity is improved.

Various technical terms and/or acronyms will be utilized in the description of the embodiment. Those skilled in the art are familiar with these and other terms which may be utilized herein. A short list of the more common ones with their definitions include: (1) BTS: Base Transceiver Subsystem; (2) DCCH: Dedicated Control Channel; (3) DTX: Discontinuous Transmission; (4) SCH: Supplemental Channel; (5) CDMA: Code Division Multiple Access; (6) FER: Frame Error Rate; (7) MS: Mobile Station; and (8) SNR: Signal-to-Noise Ratio, utilized interchangeably with (9) Eb/No: bit energy-to-noise spectrum density ratio.

Figure 1A:
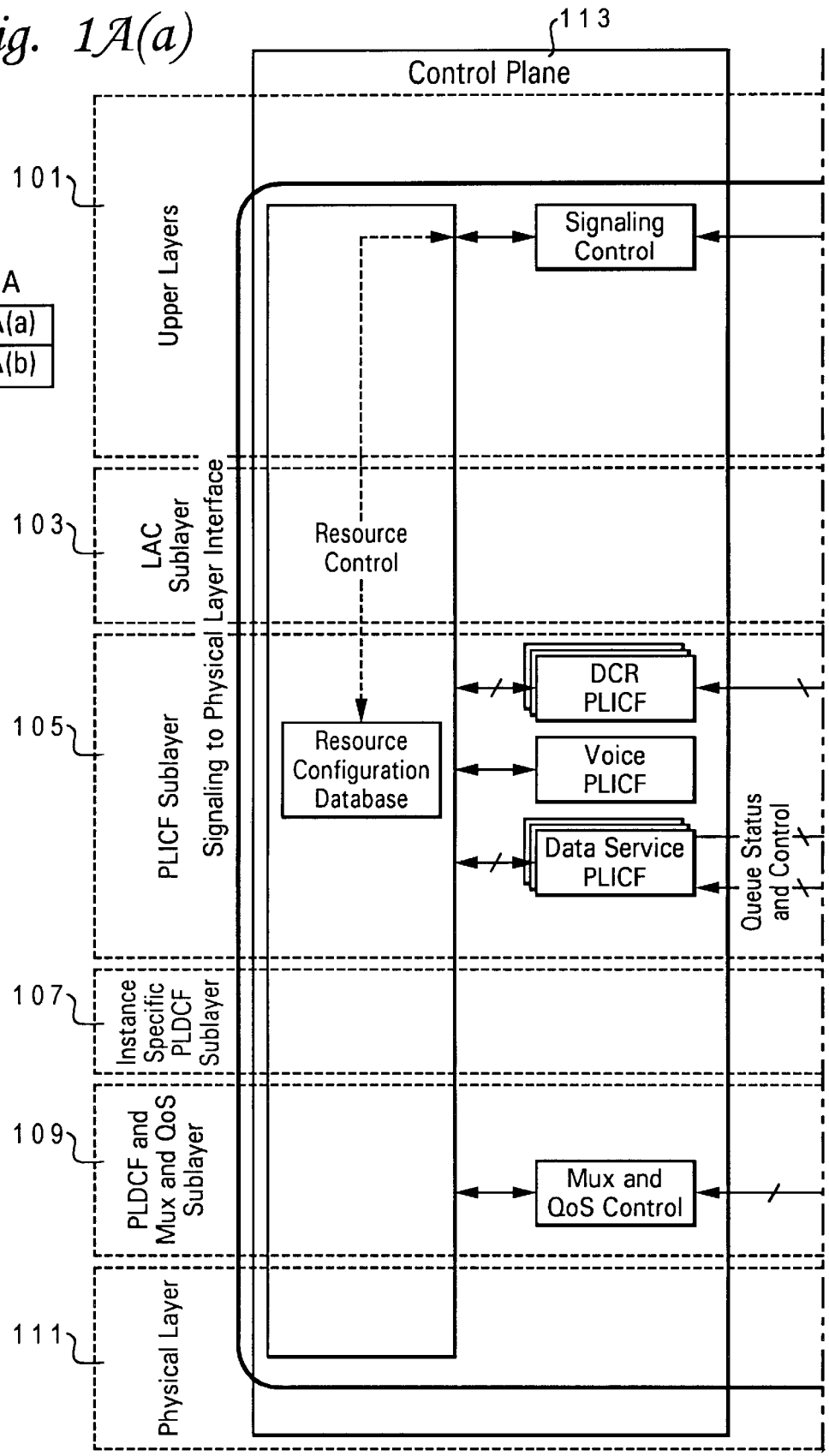
FIG. 1A illustrates a CDMA-2000 architecture in which a preferred embodiment of the present invention may be implemented.
Figure 1A:
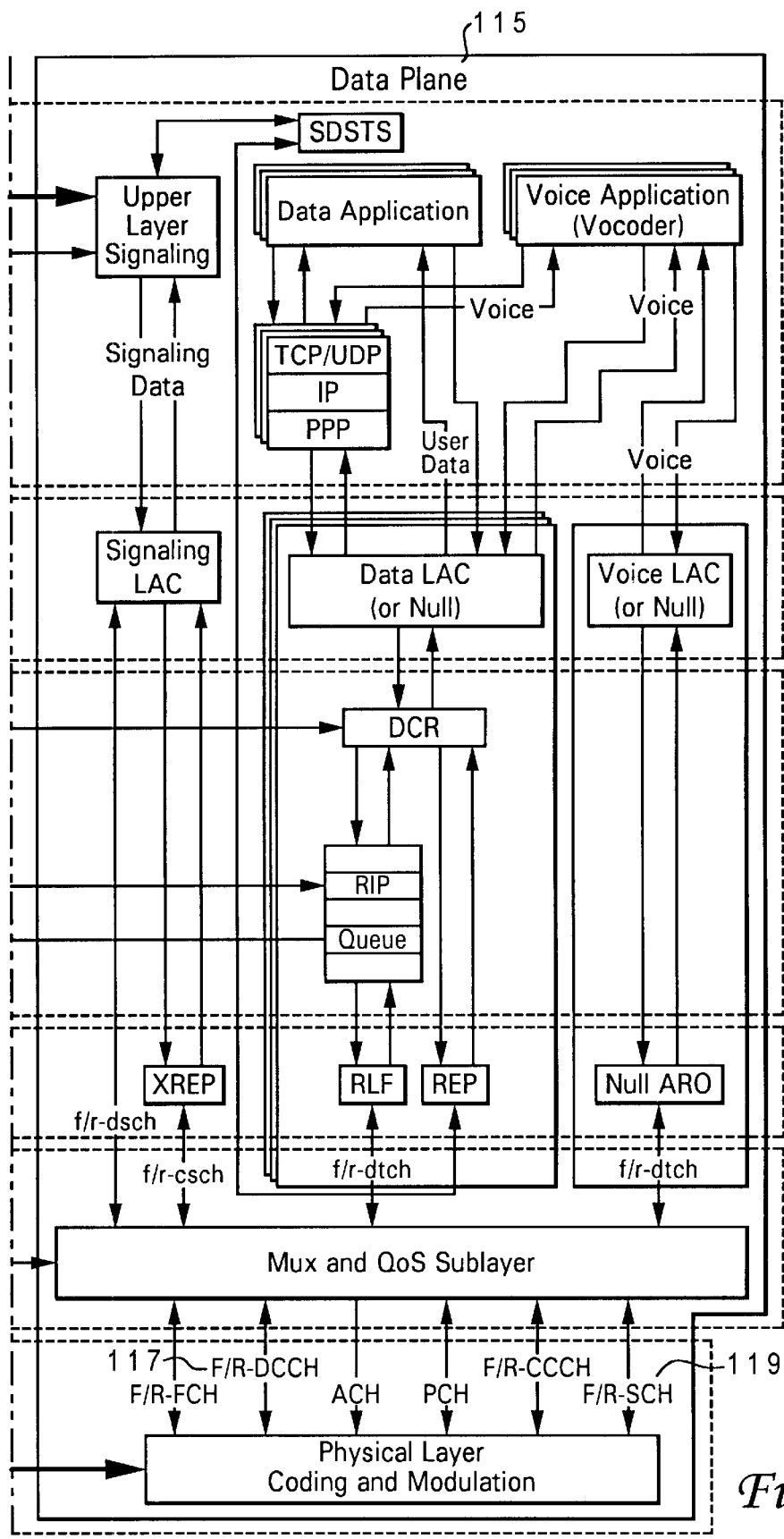

The preferred embodiment of the invention is carried out in a CDMA 2000 telecommunications network. FIG. 1A illustrates the general architecture of CDMA 2000. CDMA architecture consists of six primary layers. These include the upper layer 101, the LAC sublayer 103, the physical layer independent convergence function (PLICF) sublayer 105, the instance specific physical layer dependent convergence function (PLDCF) sublayer 107, the PLDCF and Mux and quality of service (QoS) sublayer 109, and the physical layer 111. Each layer further consists of a control plane 113 and a data plane 115. DCCH 117, SCH 119, and the various embodiments of the present invention are substantially implemented in the data plane 115 of physical layer 111.

Figure 1B:
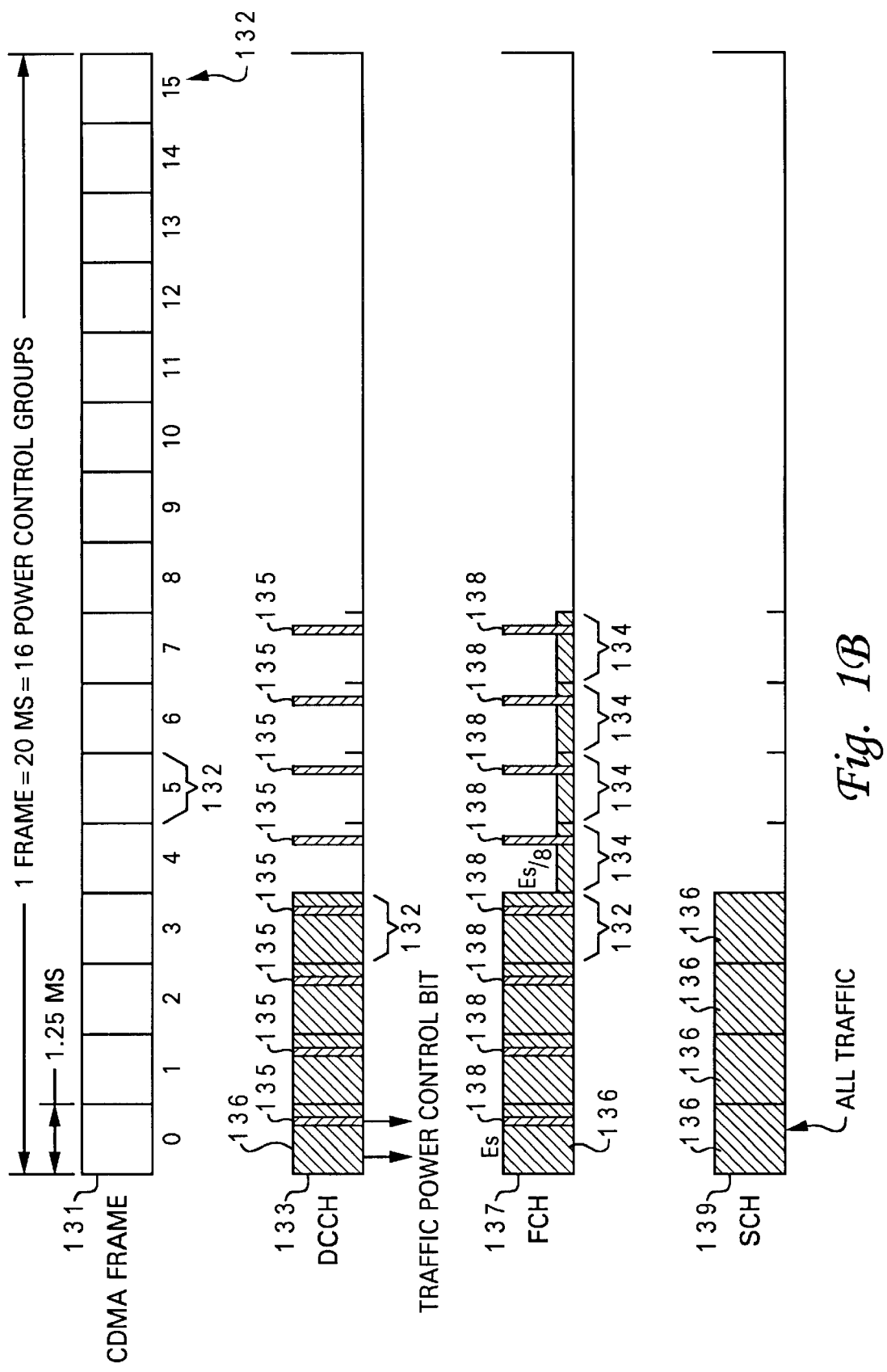
FIG. 1B illustrates the transmission frame utilized within the preferred embodiment of the invention.

FIG. 1B illustrates a series of frames which are transmitted within an exemplary CDMA 2000 communications system utilized within the invention. Each frame is 20 ms long, which equates to 16 power control groups (or blocks) 132. Depicted are a CDMA frame 131, a DCCH frame 133, a FCH frame 137 and a SCH frame 139. The first four power control blocks 132 of DCCH frame 133 are shown with data traffic 136. Each power control block 132 of DCCH frame 133 also has an associated power control bit 135. FCH frame 137 also has associated power control bits 138 within each power control block 132. However, unlike DCCH frame 133 which may transmit a power control bit 135 without any data traffic 136 in a power control block 134 (as illustrated in the second set of four power control blocks 132 in DCCH frame 133), FCH frame 137 does not support DTX and therefore transmits with a power level of ⅛ of the transmit power (as illustrated by the second set of four power control blocks 134 in FCH frame 137). SCH frame 139 transmits only data traffic 136 (i.e., no power control bit 135). During implementation of one embodiment of the invention, a '0' value of the power control bit 135 indicates to the mobile station that it is to increase the mean output power level, and a '1' value indicates to the mobile station that it is to decrease the mean output power level. The amount that the mobile station increases or decreases it power for every power control bit 135 is determined by a system designer and other environmental considerations.

Figure 2:
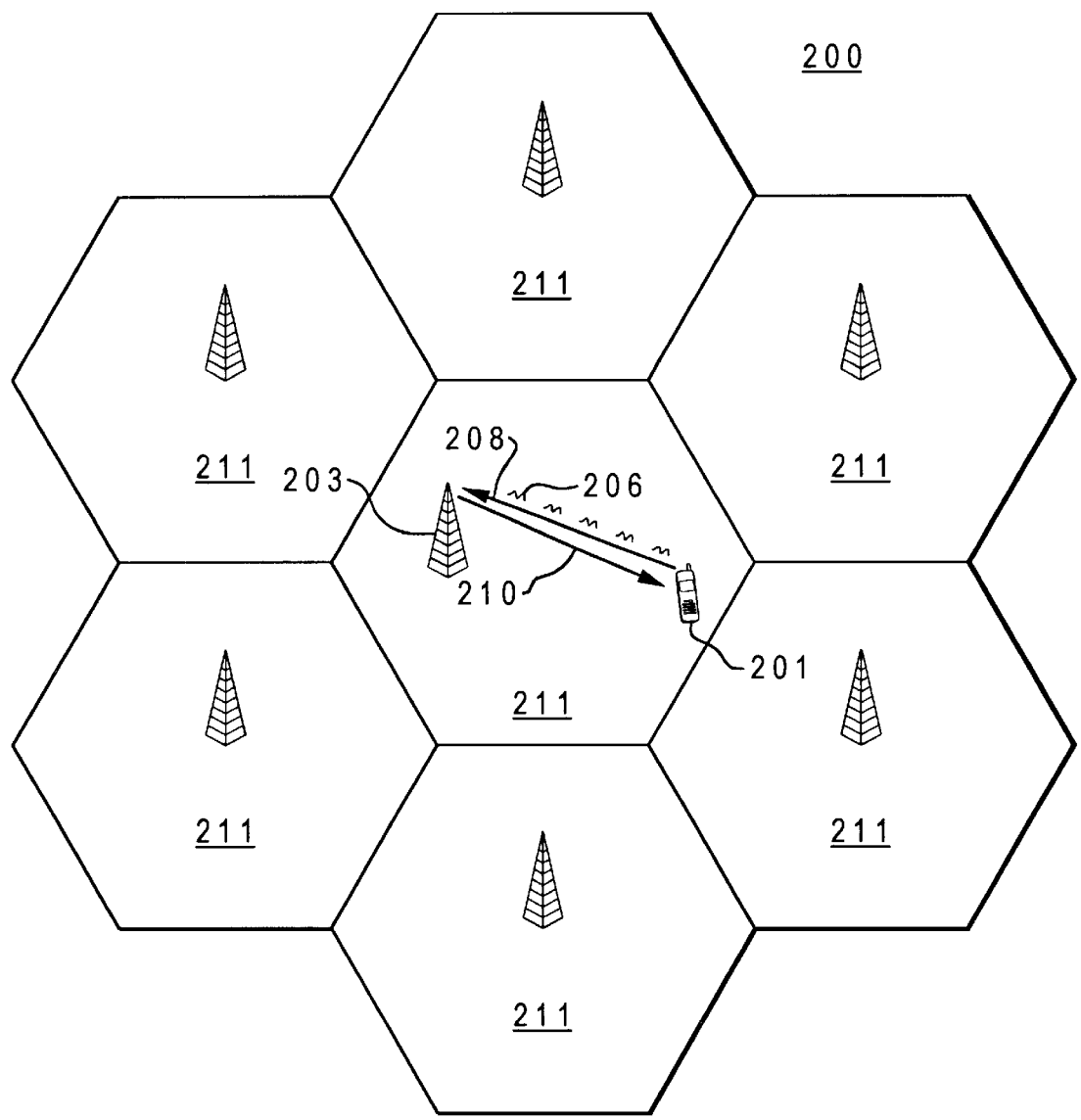
FIG. 2 illustrates a wireless system utilized in accordance with a preferred embodiment of the present invention.

Turning now to FIG. 2, there is depicted a basic mobile cellular transmission system. Mobile transmission system 200 consists of a representative cell 211, for CDMA architecture, in which is located a base station (ETS) 203. Receiving or target mobile station (MS) 201 accepts transmitted packets via airwaves 206 from originating BTS 203. The underlying transmission scheme utilizes CDMA protocol and is controlled by a series of routers, gateways, etc. not illustrated in this embodiment. Two arrowed paths are depicted corresponding to the forward propagation path 208 and reverse propagation path 210.

Two methods are presented to solve the power control and call drop problems with DTX mode. Both rely on log the receiver know whether or not the transmitter gates off the traffic channel on the DCCH and SCH. This allows the application of two different power control algorithms to two transmission states. The first method is power detection based, and the second is signaling based. Both methods can be used on both the forward and reverse links.

Two methods are presented in this disclosure to solve the power control and call drop problems with DTX mode. Both rely on letting the receiver know whether or not the transmitter gates off the traffic channel on the DCCH and SCH. This allows the application of two different power control algorithms to two transmission states. The first method is power detection based, and the second is signaling based. Both methods can be used on both the forward and reverse links.

A. POWER DETECTION METHOD

With the power detection method, the receiver tries to detect whether DTX is on or off based on the received signal. One idea is to use the power level (or SNR) of the traffic channel on the DCCH or SCH for the detection since the power level is high when the traffic bits are sent and low when not. The invention recognizes that the absolute value of the power level varies widely with fading. Detection of the presence of traffic by comparison with an absolute threshold is unreliable, because a severe fade can decrease the received power to a value below the threshold no matter how small it is set. To eliminate this problem, the invention utilizes the ratio of $SNR_{traffic}$ to $SNR_{pcb}$ as a decision variable. More specifically, in DCCH, the decision variable is the ratio of DCCH traffic bits SNR to DCCH power control bits SNR. In the case of SCH, the decision variable is the ratio of SCH traffic bits SNR to DCCH or FCH power control bits SNR. Because fading over traffic bits is highly correlated with fading over power control bits, the decision variable is not sensitive to fading, MS location, and/or propagation environment.

Figure 3:
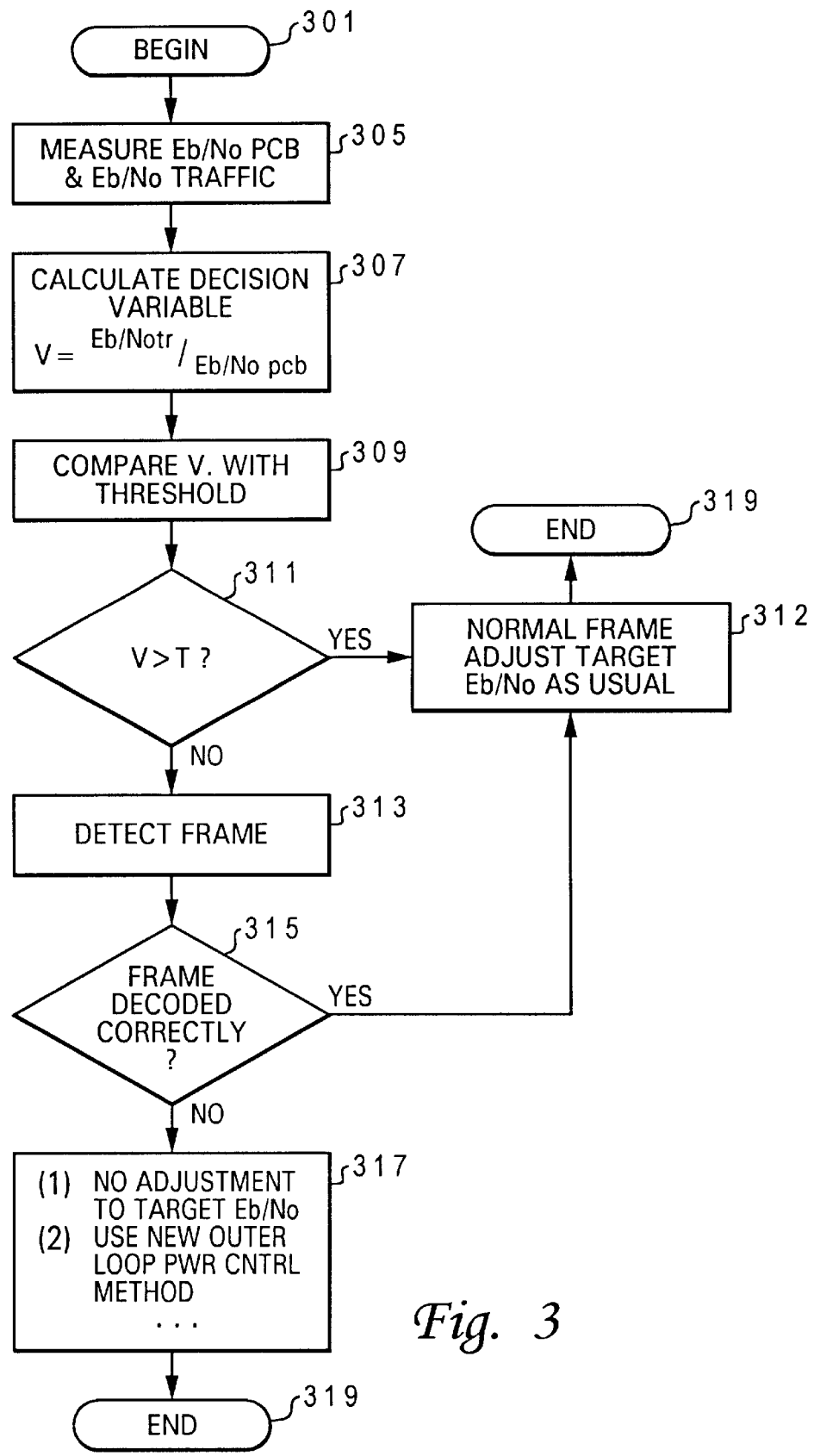
FIG. 3 is a high level flow diagram of the power control process utilizing a power ratio in accordance with a preferred embodiment of the present invention.

FIG. 3 is a high level flow diagram of a process in the power detection method utilized to control the target Eb/No. In the preferred embodiment, the functionality of the above processes is implemented in the logic units of the BTS and/or MS and other hardware or software components. After the process begins (step 301), when the frame arrives at the receiver, the Eb/No values of the traffic and power control bits (pcb) are read and evaluated (step 305). Then, a decision variable, V, is calculated over a frame period (step 307). The decision variable is a ratio of the evaluated signal strength of the traffic to the signal strength of the pcb and is calculated as:

$$V = \frac{(E_b/N_o)_{traffic}}{(E_b/N_o)_{pcb}}$$

Then, V is compared to a pre-determined threshold, T (step 309), and a determination is made of whether the value of V is greater than that of T (step 311). If V is greater than T, then a normal frame is being transmitted, and the receiver detects frame quality and then adjusts the target Eb/No as the normal power control does (step 312). Then the process ends (step 319). If, however, V is less than T, then the receiver assumes the current frame is a traffic channel gated off frame, but still tries to detect the frame (step 313). A determination is then made on whether the frame has been detected correctly (step 315). If the frame is decoded correctly (i.e., the frame is not really gated-off), the target Eb/No will be decreased as in a usual case (step 312). If, however, the detection indicates a bad frame, then the receiver either does not adjust the target Eb/No, or uses an outer loop power control method (step 317) based on the reception of something other than traffic frames. Then the process ends (step 319).

Simulations of the invention were conducted for different MS speeds, locations and propagation environments to illustrate the effectiveness of the detection method of this invention. The simulation is based on the IS-2000 DCCH configuration with the following specifications. The data rate of the DCCH is 9.6 kb/s. The coding rate is one half, and the spreading gain is 64. The power control step size on the forward link is 0.5 dB. The maximum forward gain is fixed at 0.5 or 50% of maximum BTS output power. The pilot channel gain is −7 dB relative to the maximum BTS output power. A single multipath Rayleigh fading channel is considered and the ratio of in-cell to out-of-cell interference is 8 dB. The output of simulations is the decision variable in two cases. One is the normal traffic channel being transmitted, the other is the traffic channel being gated-off.

Figure 5A:
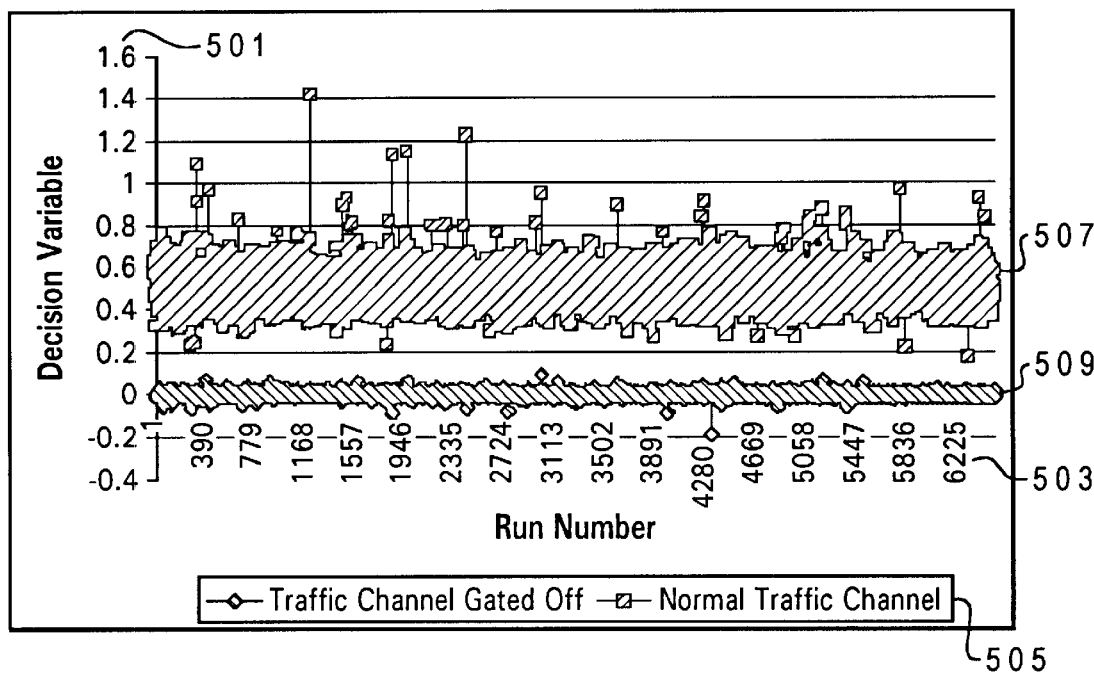
FIGS. 5A, 5B, and 5C depict graphs of the decision variable for simulations at different MS speed in accordance with a preferred embodiment of the present invention.
Figure 5B:
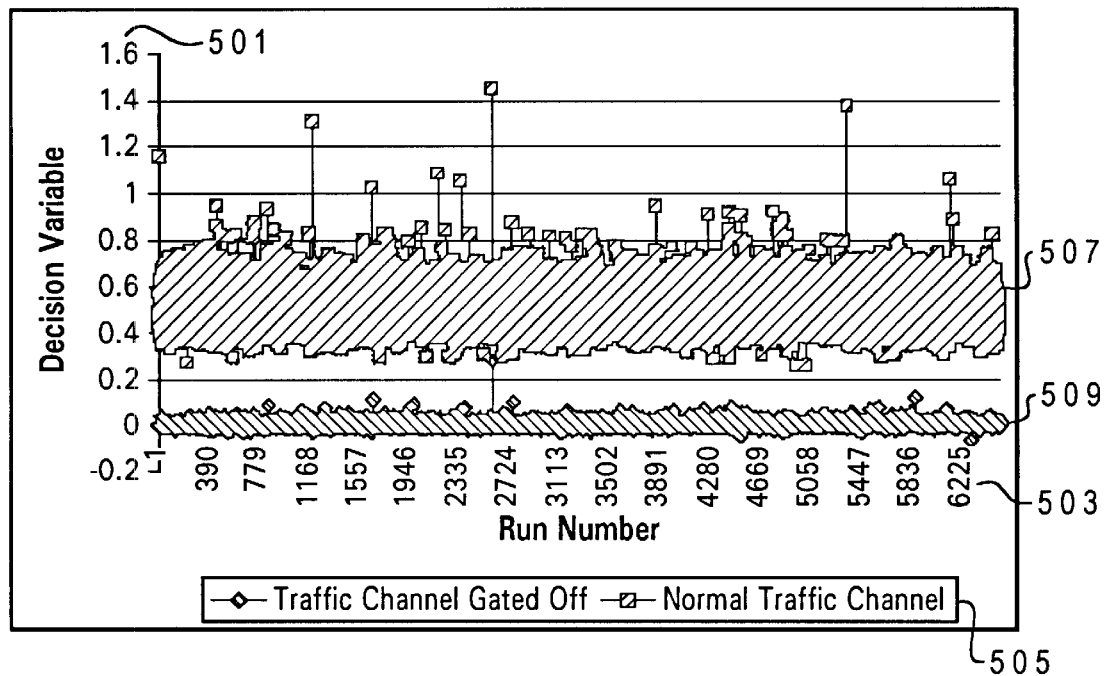
Figure 5C:
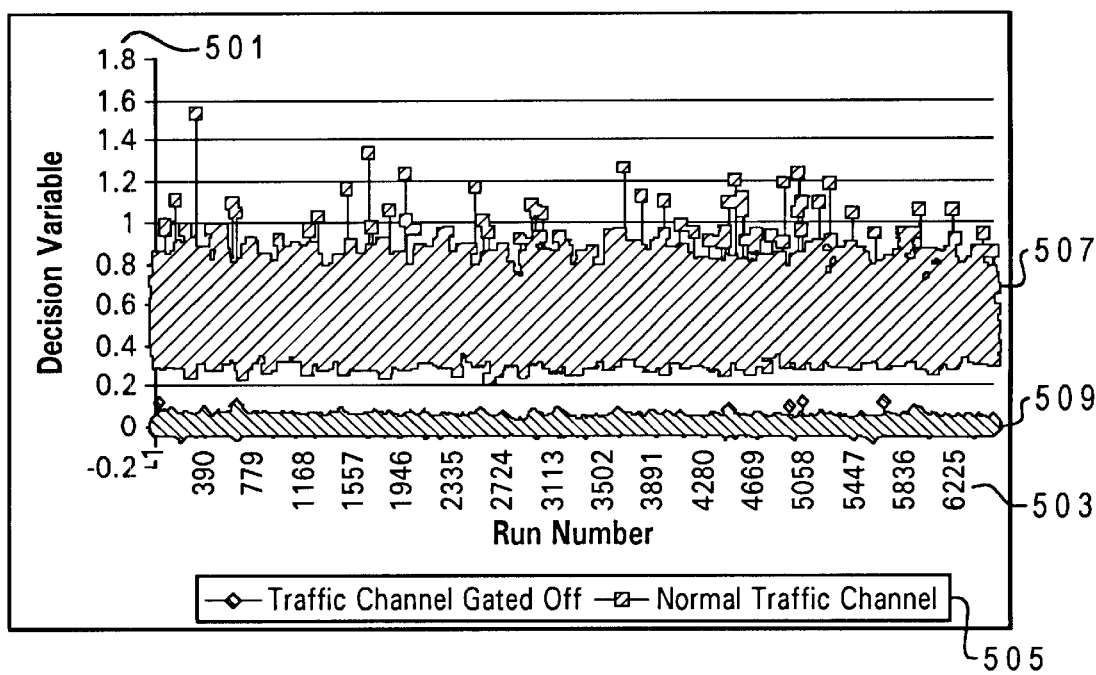

FIGS. 5A, 5B, and 5C show the decision variable for different MS speeds during normal traffic channel and gated traffic channel operation as illustrated in the key 505. These figures represent the changes due to different mobile speeds and will be described together. FIG. 5A represents a mobile speed of 3 km/h, while FIGS. 5B, and 5C represent speeds of 30 km/h and 120 km/h, respectively. The decision variable is plotted along the Y axis 501 against the run number plotted on the X axis 503. Two sets of points are plotted. The higher physical level points represent the normal traffic channel 507, while the lower physical level points represent the gated traffic channel 509. Gated traffic channel 509 is clearly delineated close to the zero reference point of the Y axis 501. Normal traffic channel 507 is not as clearly delineated, but falls within a range having a mean value of about 0.5 on the Y axis 501. Thus, as is illustrated, the decision variable is fairly confined and well separated with a mean value of zero if the traffic channel is gated off, and a mean value of about 0.5 if the normal traffic channel is transmitted. Therefore, for this illustrative embodiment, the value of the threshold, T, is selected as 0.15 to separate/distinguish the normal traffic channel and the gated off traffic channel.

Figure 6A:
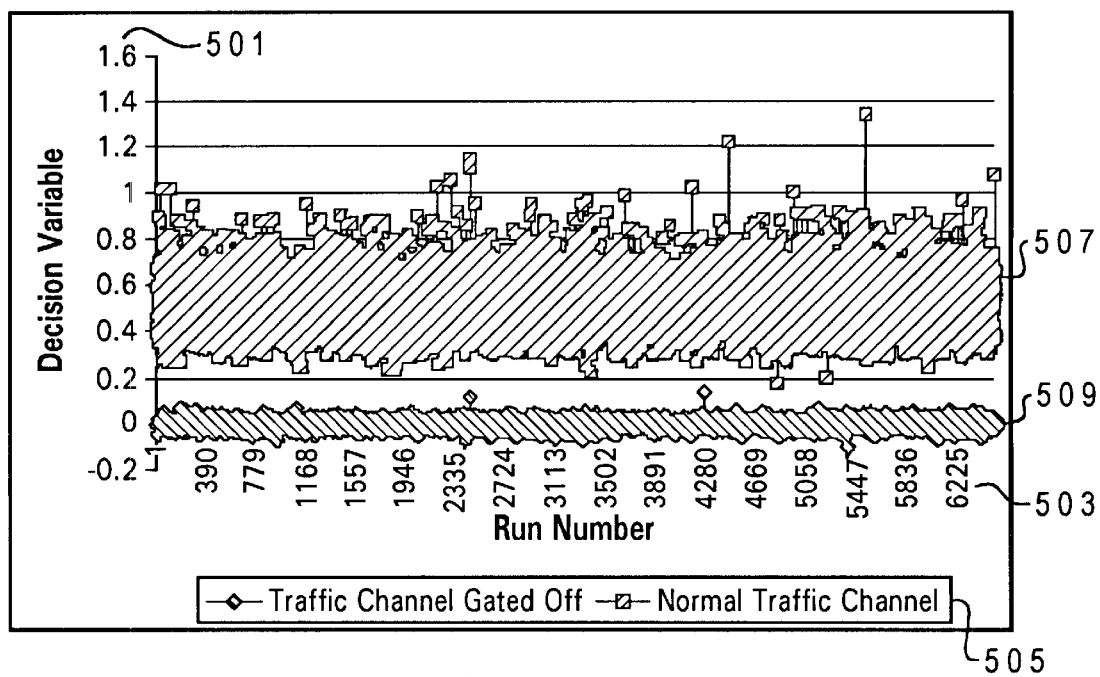
FIGS. 6A, 6B and 6C depict graphs of the decision variable at different interference environments at two path Rayleigh fading environment in accordance with a preferred embodiment of the present invention.
Figure 6B:
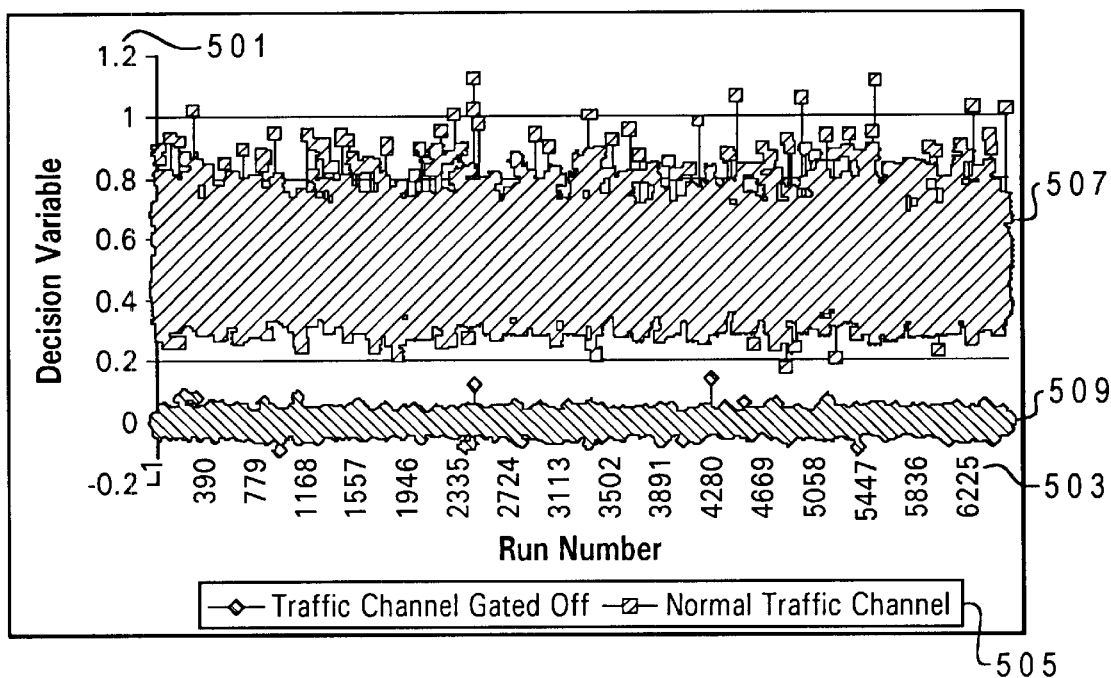
Figure 6C:
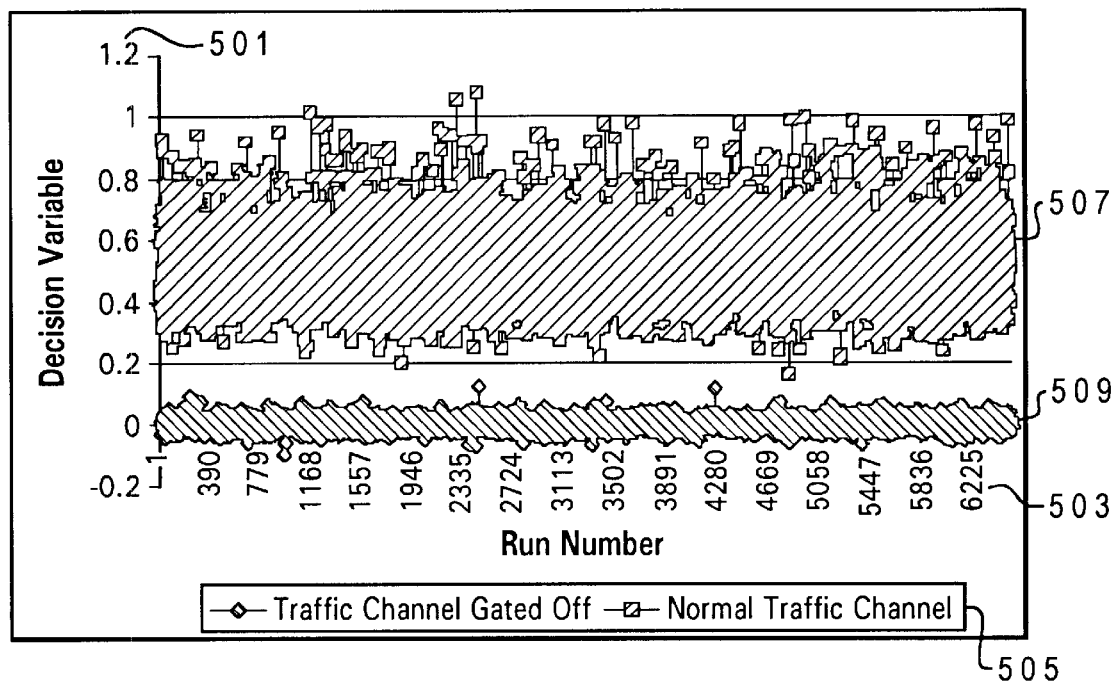

To illustrate the sensitivity of the power detection algorithm to mobile location and propagation environment, the mobile speed was fixed at 30 km/h and a series of simulations run for two-path Rayleigh fading environment. FIGS. 6A, 6B and 6C show the decision variable at the mobile speed of 30 km/h for different interference environments, which translates into different mobile locations. The axes and variables are similar to those of FIG. 5A and have been described with reference to that figure. The ratio of interference cost within the cell (Ior) and interference cost outside of the cell (Ioc) in FIG. 6A is 2.22 dB, while those of FIGS. 6B and 6C are 3.98 dB and 6.99 dB, respectively. When the distribution of the decision variable FIGS. 6A, 6B and 6C are compared, the distributions of the decision variable in different cases are very similar to each other. Therefore, the power detection method of this invention is not sensitive to the mobile location FIGS. 6A, 6B and 6C also show the decision variable for two-path Rayleigh fading environment at the mobile speed of 30 km/h. Compared to FIG. 5B, a single-path Rayleigh fading environment, the mean values of the decision variable on both the normal traffic channel and the gated off traffic channel remain unchanged. Therefore, the optimal threshold in the detection method of the implementation can be applied to any transmission condition.

Two observations are visible from the above figures: (1) The decision variables at different Ior/Ioc values are very similar to each other. This implies that the power detection method is not sensitive to the mobile location; and (2) compared with the one-path case, the separation point between the decision variable of normal traffic channel and the decision variable of gated off traffic channel remains unchanged. Therefore, the optimal threshold in the decision method can be used in different propagation environments. Based on the above results, it is seen that the power detection method of the present invention is not sensitive to mobile speed, mobile location and propagation environment. The invention can thus be used in all situations.

B. SIGNALLING METHOD

The signal method is an outer loop power control method to solve the power control problem in DTX mode. The receiver is enhanced to include the capability of distinguishing and interpreting the indicator bit. In the implementation of the invention, one or two power control bits per frame are utilized as a DTX indicator. The DTX indicator informs the receiver MS whether the traffic channel in the frame is transmitted or gated off.

In a preferred embodiment, the first power control bit in a frame is utilized to indicate the traffic channel status of the current frame. In this embodiment, a "1" represents a normal frame being transmitted, and a "0" stands for the traffic channel being gated. In alternate embodiments, the position of the indicator could be anywhere within the power control bits in a frame. Also, the "1" could be utilized to represent the traffic channel being gated In the preferred embodiment, the selected bit defaults to normal transmission mode. When a frame is to be gated on the traffic channel, the gating mechanism causes the particular bit to be set to reflect this gated transmission mode of the traffic channel. Realizing that the bit may be received in error, the invention allows the receiver to check and ensure that the frame carries no traffic, as is described below. gating mechanism causes the particular bit to be set to reflect this gated transmission mode of the traffic channel. Realizing that the bit may be received in error, the invention allows the receiver to check and ensure that the frame carries no traffic, as is described below.

Figure 4:
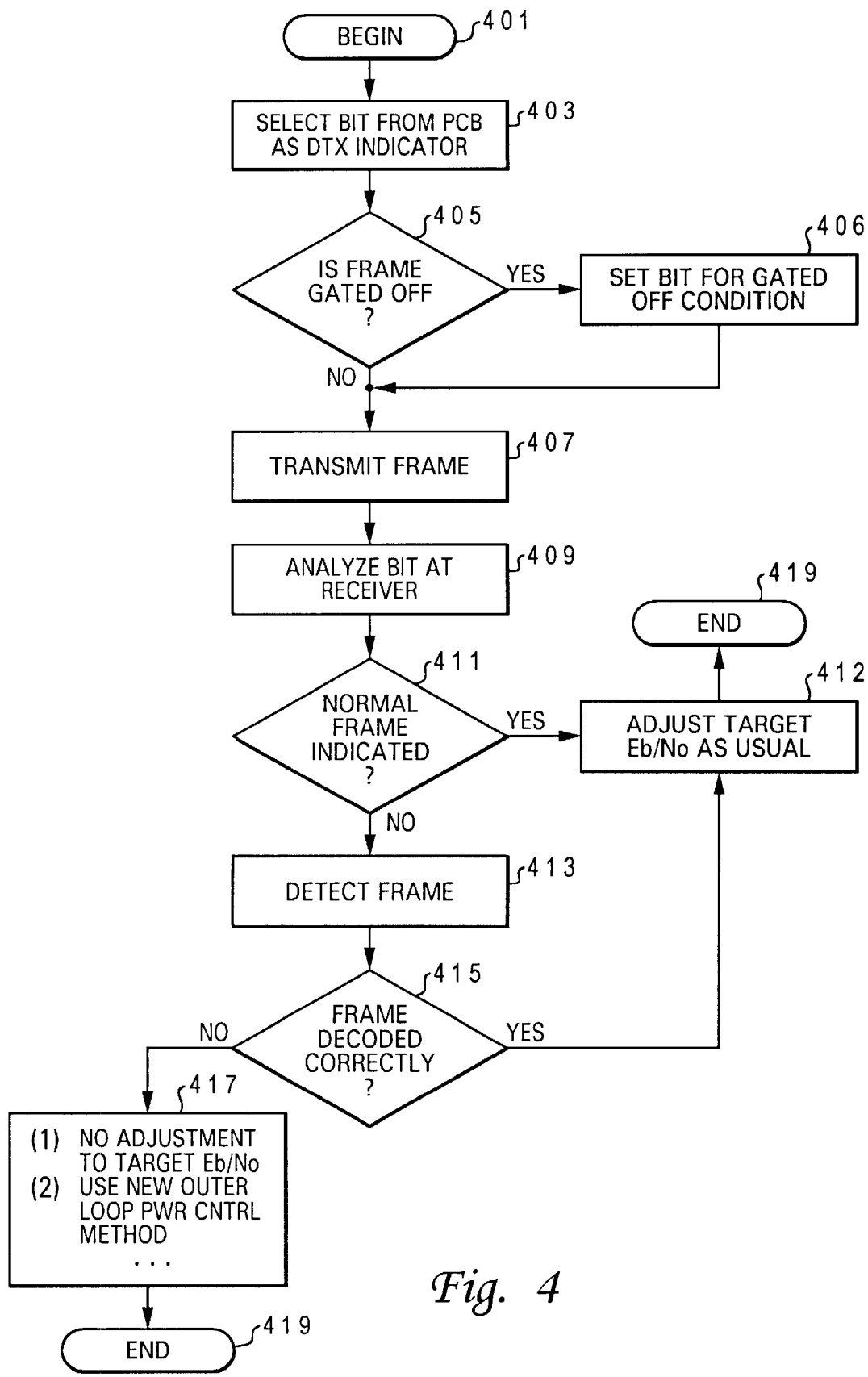
FIG. 4 is a high level flow diagram of the power control process utilizing a power control bit signalling method in accordance with a preferred embodiment of the present invention.

FIG. 4 depicts a flow chart of the process of implementing the signal method according to the present invention. The process begins (step 401) when a particular bit from the power control bits is selected to be the indicator (step 403). The traffic channel gating mechanism and frame then determines whether the traffic is gated off (step 405). If the traffic is gated off, the value of the bit is set to reflect a gated-off transmission mode (step 406). Otherwise, the bit is set to reflect normal transmission mode. The frame is then transmitted to the receiver (step 407). The receiver checks the bit to determine if it indicates a normal mode (step 409). If a normal mode is indicated (i.e. the receiver receives the indicator saying a normal frame is being transmitted) (step 411), the receiver adjusts (i.e. decreases) the target Eb/No as in the normal transmission mode (step 412). If, however, the indicator indicates a gated-off traffic channel in the current frame, then the receiver still tries to detect the frame (step 413). A check is made to determine if the frame is decoded correctly (step 415). If the frame is decoded correctly, then the frame is not really traffic channel gated off, and the target Eb/No is adjusted/decreased as in normal transmission mode (step 412). If the detection indicates a bad frame, then the receiver does not adjust the target Eb/No, or uses an outer loop power control algorithm (step 417) based on the reception of something other than traffic frames. Then the process ends (step 419).

Implementation of the signalling method of the invention has some effect on the overall system performance. When DCCH is running alone or with FCH, DCCH is 800 Hz fast power controlled. After utilizing one bit as the indicator, the fast power control reduces to 750 Hz. In the worst case scenario where DCCH is running with SCH in which the fast power control is at 400 Hz, utilizing the bit reduces it to 350 Hz fast power controlled. Thus the invention results in a loss of 50Hz fast power control. However, the simulation results, described in Appendix A, illustrate that, compared with the normal 800 Hz fast power control, the 350 Hz power control performance degradation is negligible. By utilizing this invention, the target Eb/No does not unnecessarily increase during DTX. Also, system capacity is increased.

In some implementations, the indicator bit is unprotected during transmission. In another preferred embodiment of the invention, implemented to enhance the reliability of indicator bit transmission, two power control bits per frame are utilized as "time diversity transmission." The concept of time diversity transmission permits a second bit to be sent as a back-up bit to the first indicator bit. In the time diversity transmission embodiment, two indicator bits are coherently combined at the receiver. A hard decision is made on the soft combined value to determine if the traffic has been gated off. In this way, the chances of error are significantly reduced. This saves transmit power because it reduces the likelihood that a bit will be received in error and cause the wrong power up response. The use of a time diversity transmission is thus helpful for the case in which wireless channel condition is harsh. Other detection methods, such as power detection method, may also be combined with this method to improve reliability.

While the invention has been particularly shown and described with reference to a preferred embodiment, it will be understood by those skilled in the art that various changes in form and detail may be made therein without departing from the spirit and scope of the invention.

What is claimed is:

1. A method for controlling unnecessary power increases and call drop during discontinuous transmission (DTX) mode of a frame-based transmission system, said method comprising the steps of:

evaluating at a receiver end of said transmission system a status of a transmitted frame, said status indicating one of two possible transmission modes including (1) when a gating-off of traffic occurs at the source, and (2) when no gating-off of traffic occurs and normal traffic is being transmitted, wherein said evaluating step includes the steps of:

calculating a ratio of a traffic signal-to-noise (SNR) value to a SNR of a power control bit (PCB) over a frame period, wherein said traffic SNR and said PCB SNR are from a same frame when said frame is a dedicated control channel (DCCH) frame or a fundamental channel (FCH) frame, and wherein when said frame is a supplemental channel (SCH) frame, said traffic SNR is obtained from said SCH frame and said PCB SNR is obtained from a corresponding DCCH or FCH frame;

establishing a threshold value correlated to a point above which said ratio indicates a frame with traffic is being transmitted; and comparing said ratio with said threshold; and controlling a change in said target bit energy to noise spectrum density ratio (Eb/No) in response to said evaluating step, wherein a target Eb/No is not increased when said evaluating step indicates a gating-off of traffic has occurred.

2. The method of claim 1, further comprising the steps of:

decoding said frame when a result of said comparing step indicates that a frame with traffic was transmitted; and when said fame is correctly decoded in said decoding step, detecting a quality of said frame;

when the quality falls below a predetermined level, increasing Eb/No for a target; and when the quality is above the predetermined level, decreasing the Eb/No for the target.

3. The method of claim 2, further comprising the steps of:

when a result of said comparing step indicates that a frame without traffic was transmitted and gating off of traffic occurred at the source, decoding said frame to determine if said comparing step resulted in an error; and when said frame is decoded correctly, detecting a quality of said frame;

when the quality falls below a predetermined level, increasing Eb/No for a target; and a when the quality is above the predetermined level, decreasing the Eb/No of the target.

4. The method of claim 3, further including the step of implementing an outer loop power control mechanism when said decoding step results in an error indicating that said frame is not a traffic frame.

5. The method of claim 1, wherein said detecting step detects both on a forward and a backward transmission path.

6. The method of claim 5, wherein said detecting step detects said gating-off on a dedicated control channel (DCCH) and on a supplemental channel (SCHI).

7. A system for controlling unnecessary power increases and call drop during discontinuous transmission (DTX) mode of a framebased transmission system said system comprising:

means for evaluating at a receiver end of said transmission system a status of a transmitted frame, said status indicating one of two possible transmission modes including (1) when a gating-off of traffic occurs at the source, and (2) when no gating-off of traffic occurs and normal traffic is being transmitted, wherein said evaluating means includes:

means for calculating a ratio of a traffic signal-to-noise (SNR) value to a SNR of a power control bit (PCCB) over a frame period, wherein said traffic SNR and said PCB SNR are from a same frame when said frame is a dedicated control channel (DCCH) frame or a fundamental channel FCH) frame, and wherein when said frame is a supplemental channel (SCH) frame, said traffic SNR is obtained from said SCH frame and said PCB SNR is obtained from a corresponding DCCH or FCH frame;

means for establishing a threshold value correlated to a point above which said ratio indicates a frame with traffic is being transmitted; and means for comparing said ratio with said threshold; and means for controlling a change in said target bit energy to noise spectrum density ratio (Eb/No) in response to said evaluating means, wherein a target Eb/No is not increased when said evaluating step indicates a gating-off of traffic has occurred.

8. The system of claim 7, further comprising:

means for decoding said frame when a result of said comparing step indicates that a frame with traffic was transmitted; and when said frame is correctly decoded by said decoding means,
    means for detecting a quality of said frame;
    when the quality falls below a predetermined level, means for increasing Eb/No for a target; and
    when the quality is above the predetermined level, means for decreasing the Eb/No for the target.

9. The system of claim 8, further comprising:

when a result of said comparing step indicates that a frame without traffic was transmitted and gating off of traffic occurred at the source, means for decoding said frame to determine if said comparing step resulted in an error, and when said frame is decoded correctly, means for detecting a quality of said frame;
    when the quality falls below a predetermined level, means for increasing Eb/No for a target; and
    when the quality is above the predetermined level, means for decreasing the Eb/No of the target.

10. The system of claim 9, further comprising the means for implementing an outer loop power control mechanism when said decoding step results in an error indicating that said frame is not a traffic frame.

11. The system of claim 7, wherein said detecting means detects both an a forward and a backward transmission path.

12. The system of claim 11, wherein said detecting means detects said gating-off on a dedicated control channel (DCCH) and on a supplemental channel (SCH).

13. The system of claim 11, wherein said detecting means detects said gating-off on a supplemental channel (SCH).

14. A method for controlling transmission power in a CDMA system, said method comprising:

evaluating a ratio of a signal to noise ratio (SNR) of traffic within said transmission with a SNR of a power control bit of said transmission to determining whether the traffic channel is gated off;

adjusting a power level of a subsequent transmission based on the result obtained from said evaluating step;

wherein said evaluating step includes calculating a decision variable as a ratio of said SNR of said traffic and said SNR of said power control bit(PCB), wherein said traffic SNR and said PCB SNR are from a same frame when said frame is a dedicated control channel (DCCH) frame or a fundamental channel (FCH) frame, and wherein when said frame is a supplemental channel (SCH) frame, said traffic SNR is obtained from said SCH frame and said PCB SNR is obtained from a corresponding DCCH or FCH frame; and wherein said adjusting step comprises comparing said decision variable with a pre established threshold, wherein a result of said comparison is utilized to determine whether to increase power or decrease power within said subsequent transmission.

15. The method of claim 14, wherein said transmission includes a forward control channel (FCH) frame with a power control bit and said evaluating step includes:

determining a power level of said power control bit; and
  determining a power level of a traffic channel within said FCH frame;
  wherein the power level of said control bit and the power level of said traffic channel are correlated to yield a substantially common ratio regardless of the transmission speed, and transmission conditions and environment, including the effects of fading on the transmission.

16. The method of claim 14, wherein when the decision variable is greater than said threshold, normal power control is asserted, wherein a frame quality is detected and a target SNR is determined based on said frame quality.

17. The method of claim 14, wherein when said decision variable is less than said threshold, said method further comprises:

attempting to decode said fame as a normal traffic frame;
  wherein, when the frame is decoded as a normal traffic frame in said attempting step, asserting normal power control for a subsequent transmission; and
  wherein, when the frame is not detected as a normal traffic frame, performing one of several power control methods from among not adjusting the target SNR and utilizing outer loop power control for receipt of a frame other than a traffic frame.

18. The method of claim 14, further including:

selecting a threshold value for comparison to a decision variable of the ratio of SNR traffic to SNR power control bit;
  providing said threshold value to a receiver of said transmission; and
  wherein said threshold value is selected based on comparative analysis of different traffic conditions and speed and represents a conservative value that provides a substantially accurate result during a subsequent comparison of said threshold with said decision variable so correct power control may be applied to transmissions within said CDMA system regardless of transmission speed, mobile location, and propagation conditions and environment, including the effects of fading.

* * * * *

UNITED STATES PATENT AND TRADEMARK OFFICE
CERTIFICATE OF CORRECTION

PATENT NO. : 6,587,447 B1
DATED : July 1, 2003
INVENTOR(S) : Wang et al.

It is certified that error appears in the above-identified patent and that said Letters Patent is hereby corrected as shown below:

Column 6,
Line 48, delete "log" and insert -- letting --.

Column 9,
Line 8, delete "gated In" and insert -- gated. In --
Line 15, delete "gating mechanism causes the particular bit to be set to reflect this gated transmission mode of the traffic channel. Realizing that the bit may be received in error, the invention allows the receiver to check and ensure that the frame carries no traffic, as is described below."

Column 12,
Line 27, should read as follows:
14.    A method for controlling transmission power in a CDMA system, said method comprising:
    receiving a transmission from said CDMA system;
    evaluating a ratio of a signal to noise ratio (SNR) of traffic within said transmission with a SNR of a power control bit of said transmission to determining whether the traffic channel is gated off;
    adjusting a power level of a subsequent transmission based on the result obtained from said evaluating step;
    wherein said evaluating step includes calculating a decision variable as a ratio of said SNR of said traffic and said SNR of said power control bit(PCB), wherein said traffic SNR and said PCB SNR are from a same frame when said frame is a dedicated control channel (DCCH) frame or a fundamental channel (FCH) frame, and wherein when said frame is a supplemental channel (SCH) frame, said traffic S NR is obtained from said SCH frame and said PCB SNR is obtained from a corresponding DCCH or FCH frame; and

UNITED STATES PATENT AND TRADEMARK OFFICE
CERTIFICATE OF CORRECTION

PATENT NO. : 6,587,447 B1
DATED : July 1, 2003
INVENTOR(S) : Wang et al.

It is certified that error appears in the above-identified patent and that said Letters Patent is hereby corrected as shown below:

<u>Column 12 (cont'd),</u>
wherein said adjusting step comprises comparing said decision variable with a pre-established threshold, wherein a result of said comparison is utilized to determine whether to increase power or decrease power within said subsequent transmission.

Signed and Sealed this

Ninth Day of March, 2004

JON W. DUDAS
*Acting Director of the United States Patent and Trademark Office*